B. GRANVILLE.
PIPE COVER.
APPLICATION FILED MAR. 30, 1916.
1,220,328.
Patented Mar. 27, 1917.
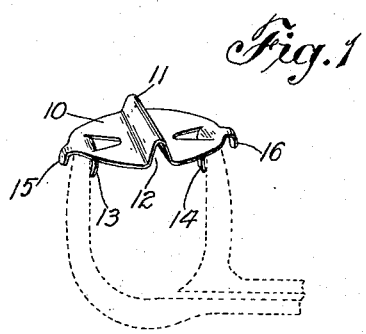
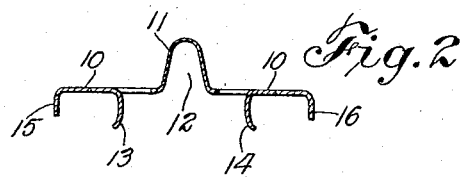

UNITED STATES PATENT OFFICE.

BERNARD GRANVILLE, OF NEW YORK, N. Y.

PIPE-COVER.

1,220,328.  Specification of Letters Patent.  Patented Mar. 27, 1917.

Application filed March 30, 1916. Serial No. 87,731.

*To all whom it may concern:*

Be it known that I, BERNARD GRANVILLE, a citizen of the United States, residing at New York City, in the county of New York and State of New York, have invented certain new and useful Improvements in Pipe-Covers, fully described and represented in the following specification and the accompanying drawings, forming a part of the same.

This invention relates to pipe covers, and more particularly to an article of this character which may be entirely separated from the bowl of the pipe.

The object of the invention is to provide a pipe cover of simple and cheap construction which may be readily applied to and removed from the bowl of a pipe, and shall be suitable for pipes of varying sized bowls, and which shall be so formed or constructed as to provide for the necessary draft for the pipe, and so as to be readily turned about the top of the pipe bowl in a manner to insure the proper draft while excluding the wind from the bowl of the pipe. To these ends, a cover embodying all the features of the invention is made from a single blank or plate of sheet metal shaped with an upwardly projecting loop extending diametrically across the plate and with downwardly projecting prongs for engaging the inner wall of the bowl of the pipe, and having finger grips extending beyond the prongs for facilitating the application of the cover to and its removal from the bowl of the pipe. The upwardly projecting loop serves as a spring permitting the adjacent portions of the plate to be pressed toward each other and cause an approaching movement of the prongs, and by its return movement to force the portions of the plate apart again and the prongs into engagement with the wall of the pipe bowl; and the loop also serves as a draft flue, its sides being suitably spaced apart and its ends open. The device might be made of hard spring metal, but when made of such material the gripping prongs, which are punched out and turned downward from the body of the plate, are apt to break off. I therefore most desirably make the device from a softer metal and perform a drawing action on the spring loop whereby it is reduced in thickness and its elasticity is increased, and also usually its flexibility, by the compacting and hardening of the material due to the drawing action.

In the accompanying drawings:—

Figure 1 is a perspective view of an approved form of pipe cover embodying the invention, a portion of a pipe to which the cover is shown as attached being indicated in dotted lines; and Fig. 2 is an enlarged vertical section through the cover shown in Fig. 1.

Referring to the drawings, the cover shown therein comprises a substantially circular metal disk or plate 10 having an upwardly directed spring loop 11 formed integral with the plate extending diametrically across the same, the ends of the loop being open and the sides thereof being spaced sufficiently apart to permit of their being bent slightly toward each other, and also so that the space 12 between the sides of the loop will form a draft flue opening into the bowl of the pipe. On opposite sides of the loop the plate 10 is provided with downwardly projecting prongs 13 and 14 stamped out from the disk, and which are most desirably curved or bent outwardly, as shown in Fig. 2. The openings formed through the disk in stamping out the prongs also serve as draft openings supplementing the flue 12. At opposite edges and in substantial alinement with the prongs 13 and 14, the disk 10 is provided with lugs 15 and 16 which serve as finger grips to facilitate the application of the cover to and its removal from the bowl of the pipe, the ends of these lugs being desirably bent downward as shown.

The device is most desirably made from a medium or soft grade of steel or other suitable metal; and in order that the loop 11 in the completed article may have the desired elasticity, I most desirably first bend the plate or blank so as to form a loop of less depth than that desired in the completed article, and then complete the formation of the loop by drawing it out to its full desired depth. Such drawing of the metal in the loop has the effect of making it thinner and more elastic, as before pointed out. It is of advantage to have the prongs 13 and 14 of metal so comparatively non-elastic that they may be more readily bent and thereby adjusted to fit the cover to pipe bowls of different internal diameters. Adjustment of the cover for pipe bowls of different sizes may also be effected by bending the sides of the loop outwardly or inwardly to slightly separate or close together the parts of the cover. By making the cover in the manner above described, therefore, I am able to form from a single sheet metal blank a cover the different parts of which possess dissimilar characteristics to adapt them to their respective functions.

It will be seen that the cover may be readily turned around on the end of the pipe bowl about the axis thereof to change the direction in which the flue-forming loop 11 extends so as to be adjusted according to the direction of the wind in order to prevent the wind from blowing into the bowl of the pipe through said flue.

What is claimed is:

1. As a new article of manufacture, a pipe cover embodying therein a plate having an upwardly directed loop portion formed integrally therewith and extending diametrically thereacross, said loop being open at the ends and the sides thereof being spaced apart whereby a draft flue is formed, and a plurality of downwardly directed prongs extending from said plate on opposite sides of said loop and adapted to be forced by the elasticity of the loop into frictional engagement with the bowl of a pipe.

2. As a new article of manufacture, a pipe cover embodying therein a plate having an upwardly directed loop portion formed integrally therewith and extending diametrically thereacross, said loop being open at the ends and the sides thereof being spaced apart whereby a draft flue is formed, and a plurality of downwardly directed prongs extending from said plate on opposite sides of said loop and adapted to be forced by the elasticity of the loop into frictional engagement with the bowl of a pipe, and oppositely disposed finger grips at the edges of said plate adjacent said prongs whereby said prongs may be forced toward each other against the tension of the loop in applying, removing or adjusting the cover in relation to the bowl of the pipe.

3. As a new article of manufacture, a pipe cover embodying therein a plate having an upwardly directed loop portion formed integrally therewith and extending diametrically thereacross, said loop being open at the ends and the sides thereof being spaced apart whereby a draft flue is formed, and a plurality of downwardly projecting prongs stamped from said plate upon opposite sides of said loop and adapted to be forced by the elasticity of the loop into frictional engagement with the bowl of a pipe, the openings in the plate adjacent said prongs forming draft openings supplemental to the flue formed by said loop.

4. As a new article of manufacture, a pipe cover embodying therein a plate having an upwardly directed loop portion formed integrally therewith and extending diametrically thereacross, said loop being open at the ends and the sides thereof being spaced apart whereby a draft flue is formed, and a plurality of downwardly directed prongs stamped from said plate on opposite sides of said loop and adapted to be forced by the elasticity of the loop into frictional engagement with the bowl of a pipe, the material of said loop being relatively thinner and more elastic than the material of said plate and said prongs.

5. As a new article of manufacture, a pipe cover embodying therein a plate having an upwardly directed spring loop portion formed integrally therewith and extending diametrically thereacross, and a plurality of downwardly projecting prongs stamped from said plate on opposite sides of said loop and adapted to be forced by the elasticity of the loop into frictional engagement with the bowl of a pipe, the material of said loop being drawn to less thickness and greater elasticity than the material of said plate and prongs.

In testimony whereof I have hereunto set my hand in the presence of two subscribing witnesses.

BERNARD GRANVILLE.

Witnesses:
A. L. KENT,
BENJAMIN H. COHN.

Copies of this patent may be obtained for five cents each, by addressing the "Commissioner of Patents, Washington, D. C."